United States Patent [19]

Wyser

[11] Patent Number: 4,577,516

[45] Date of Patent: Mar. 25, 1986

[54] DEVICE FOR TAKING A SAMPLE FROM A CONTINUOUSLY ADVANCING WEB

[75] Inventor: Johann Wyser, Ligerz, Switzerland

[73] Assignee: Stork Brabant B.V., An Boxmeer, Netherlands

[21] Appl. No.: 617,278

[22] Filed: Jun. 4, 1984

[30] Foreign Application Priority Data

Jun. 17, 1983 [NL] Netherlands ........................ 8302175

[51] Int. Cl.[4] ............................................... G01N 1/04

[52] U.S. Cl. .............................. 73/864.41; 73/863.91; 83/919

[58] Field of Search ........... 73/864.41, 864.42, 863.91, 73/863.92, 159; 83/919, 57

[56] References Cited

U.S. PATENT DOCUMENTS

| | | | |
|---|---|---|---|
| 1,428,978 | 9/1922 | Pitts et al. | 73/159 X |
| 3,075,419 | 1/1963 | Schultz | 83/919 X |
| 3,180,190 | 4/1965 | Haselow | 83/919 X |
| 3,375,743 | 4/1968 | Levy | 83/919 X |
| 3,648,555 | 3/1972 | Schraud et al. | 83/919 X |
| 3,677,076 | 7/1972 | Herzhoff et al. | 73/159 X |
| 4,072,060 | 2/1978 | Kitai et al. | 73/863.91 X |
| 4,387,590 | 6/1983 | Alexander, III | 73/863.41 X |

FOREIGN PATENT DOCUMENTS

| | | | |
|---|---|---|---|
| 949052 | 2/1964 | United Kingdom | 83/919 |
| 832396 | 5/1981 | U.S.S.R. | 73/863.91 |

*Primary Examiner*—Stewart J. Levy
*Assistant Examiner*—Tom Noland
*Attorney, Agent, or Firm*—Watson, Cole, Grindle & Watson

[57] ABSTRACT

A device for taking a sample from an uninterruptedly traveling web (6) comprises a loop accumulator, a drum (11) near the web with suction bars (10) for temporarily retaining the web and for cutting the web twice at spaced locations. The device further comprises glueing bar (16) for rejoining both cut-off edges of the web (6).

8 Claims, 7 Drawing Figures

DEVICE FOR TAKING A SAMPLE FROM A CONTINUOUSLY ADVANCING WEB

BACKGROUND OF THE INVENTION

In rotary printing techniques wherein a paper web, a plastic web or some other substrate is printed with a pattern, the need often arises for interim checking of the printing performance or, possibly, the repeat printing pattern. In rotary printing installations where the printed web is fed into a folding or cutting station after the last processing station, such checking is feasible at the end of the installation.

The interconnection of stations for printing, drying, cutting and folding of a web in one continuous operation imposes, however, limitations as to the speed of the printing machine due to the cutting and folding operation. Placing such an installation into operation furthermore is time consuming. Consequently, there is a demand for a rotary printing installation in which the printed web, after having passed through the drying apparatus, advances to a receiving station having winding rollers without the need for folding or cutting of the web, i.e., so that the speed of the printing machine is not unnecessarily limited.

It is therefore an object of the present invention to enable a sample to be taken in such an installation without interrupting its continuous operation. The invention comprehends a device for taking such a sample from a continuously supplied printed web which is, during sampling, discharged continuously to a receiving station.

SUMMARY OF THE INVENTION

The object of the present invention is attained by providing a first accumulator device, composed of first and second sections interconnected through two coupled disk blocks, a device for cutting out a sample and subsequently joining the cut parts of the temporarily retained web, and a second accumulator device, the web first passing through the first section of the first accumulator device, then passing through the second accumulator device, subsequently through the cutting and joining device and finally through the second section of the first accumulator device.

The device for cutting and joining the web comprises a rotatably drivable drum having a longitudinal slit with an internal glueing bar, and two suction bars parallel to and at a close distance to the drum, with a cutting device between the two parallel suction bars.

The sampling device further comprises two clamping devices situated respectively before the second accumulator device and after the cutting and joining device as seen in the direction of travel of the web.

This sampling device, as will be explained in detail hereinafter, permits the web to be temporarily clamped at two separated positions, a sample to be cut out and the cut ends from the length of web between the two separated clamped positions to be rejoined without interrupting the continuous flow of web from the preceding printing installation to the following receiving station with take-up rollers.

DESCRIPTION OF THE PREFERRED EMBODIMENTS

Figure 1:
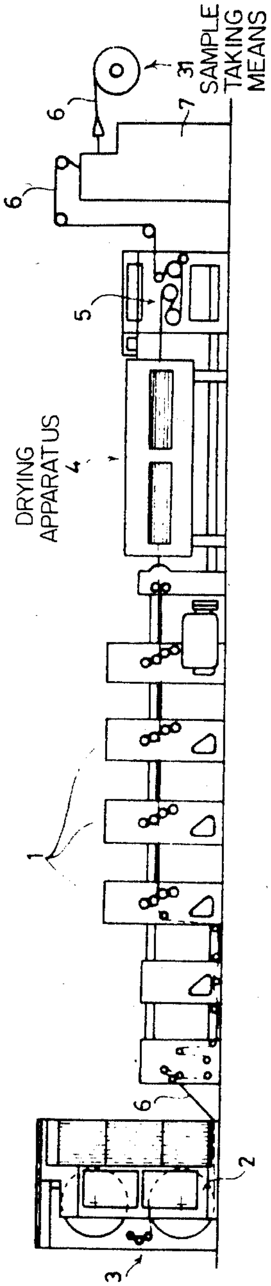
FIG. 1 is a schematic front view of a printing installation, the sample taking means being shown at the right hand side, FIG. 2 likewise is a schematic, but enlarged, view of the sample taking means together with the web accumulators.

In FIG. 1, the rotary printing installation comprises several printing units 1. At the left hand side, two supply rollers 2 for web-shaped material to be printed are located in a change over device 3 by means of which, when one roller is running out of material, it is possible to change over to the other roller to so ensure continuous operation of the installation. At the right hand side, there are also depicted some of the conventional processing installations such as a drying apparatus 4 and a roller system 5 for cooling the web 6. So far, the device generally conforms to the present state of the art.

As seen at the right hand side of FIG. 1, before a winding roller receiving station 31, there are provided so-called sample taking means 7 which constitutes the main subject of the present invention. The noted means 7 are provided for obtaining a temporarily stopped length of the web A (see FIG. 2) for a web 6 and are formed by a combination of a first loop system or accumulator 8 for taking up a certain length of the supplied web 6, a rotatable drum 11 with a supporting surface 9 provided for the web 6, and a second accumulator device 18. This drum 11 with supporting surface 9 cooperates with means 10 for temporarily retaining web 6, cutting the same twice, and for rejoining the web ends so cut with the aid of means 16.

As is best seen in FIGS. 3–7, the drum 11 is positioned with its center line 12 transverse to the direction of travel F of the web, such that the supporting surface 9 passes closely to means 10. The means 10 comprises two fixed suction bars 13 and 14 located on the side of web 6 opposite from the drum 11. Within drum 11 and adjacent to a slit in the drum, a third suction bar 15 is provided which is rotatable jointly with the drum and furthermore a so-called glueing bar 16 likewise rotatable jointly with the drum but also capable of a reciprocal motion in radial direction, for a purpose to be described hereafter. Between the fixed suction bars 13 and 14 there is provided a cutting member 17 which serves to cut web 6.

The second accumulator device 18 (see FIG. 2) comprises two fixed guide rollers 19 and a third linearly displaceable turning roller 20 rotatably attached to the piston rod 21 of a cylinder 22.

Figure 2:
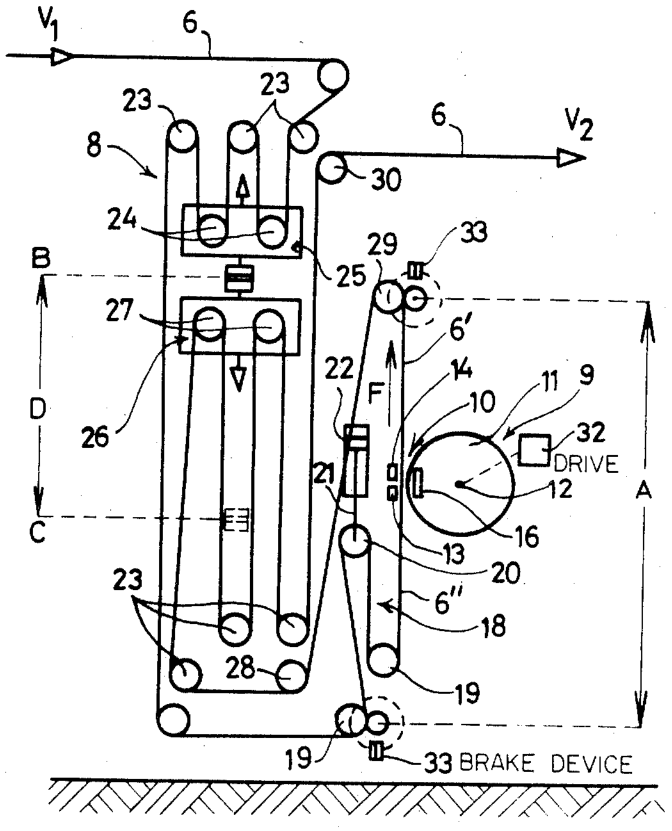
Figure 3:
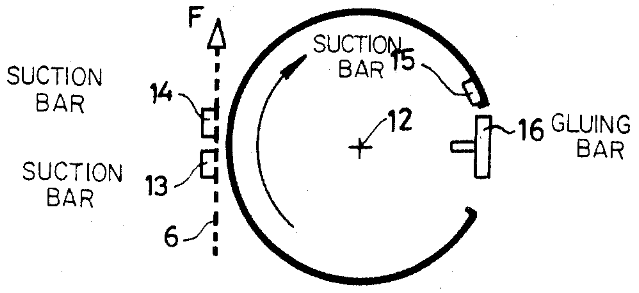
FIGS. 3–7 illustrate five successive stages of the drum constituting a detail from FIG. 2.

The first section of the accumulator 8 is shown in FIG. 2, and consists of several fixed rollers 23 and displaceable rollers 24, the latter being mounted on a so-called disk block 25. This block 25 is coupled to a disk block 26 that forms part of the second section of the accumulator 8 serving to receive web material and releasing same, during the time the web 6 is clamped against rollers 19 and 29, causing a portion A of the web to be temporarily stopped. This second section again comprises several displaceable rollers 27 cooperating with several fixed guide rollers 23 and 28.

The coupled disk blocks 25 and 26 are capable of displacement between the positions B and C. It is apparent from FIG. 2 that the printed web 6 passes through the first accumulator section with the rollers 23 and 24 in a number of loops, whereupon the web travels via rollers 19 and 20 of the second accumulator device 18.

Thereafter, the web 6 travels past the fixed suction bars 13 and 14 and over a fixed guide roller 29, and subsequently toward the second section of the first accumulator device 8 with the rollers 28, 23 and 27. Herefrom the web 6 is discharged toward the winding station 31 (see FIG. 1) via the last guide roller 30. Finally, it may be noted that drum 11 is provided with a drive 32, one roller 19 and roller 29 cooperating with a brake device 33.

Figure 4:
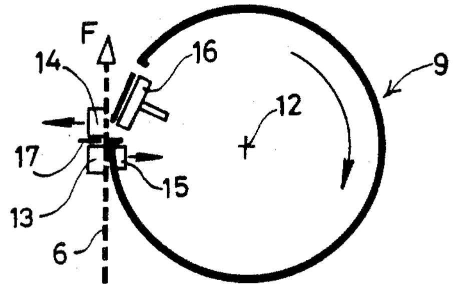
Figure 5:
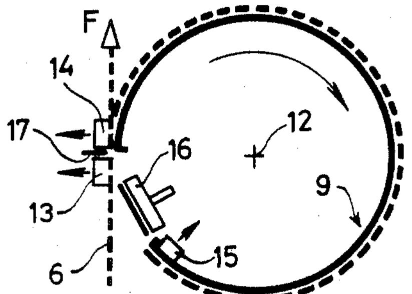
Figure 6:
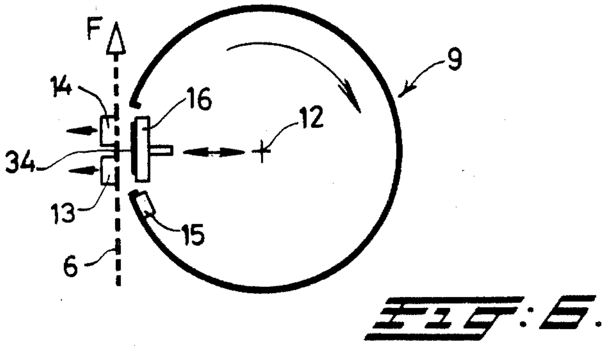

The operation of the sample taking means 7 will now be explained with reference to FIGS. 2–7. When it is decided to sample a web, the web-supporting surface 9, i.e., drum 11, is moved from the rest position (FIG. 3) at which the glueing bar 16 has been provided with an adhesive strip 34, to the start position for sampling (FIG. 4). Suction bar 15 then faces the fixed suction bar 13, web 6 being positioned therebetween. Thereupon, the brake device 33 is activated and the coupled disk blocks 25 and 26 are set in motion and gradually move from position B toward position C thus permitting temporary storage of the incoming web from the previous stations 1, 4 and 5 in the first section of the first accumulator device 8 and at the same time allowing uninterrupted delivery of the web to the receiving winding station 31.

The speed $V_1$ of the incoming web and the speed $V_2$ of the outgoing web from the first accumulator device remain equal to each other ($V_1 = V_2$) due to the coupled motion of the two disk blocks 25 and 26 of the first and second section, each having the same number of web loops. The speed $V_3$ at which the coupled disk blocks 25 and 26 move downward is then equal to $$V_3 = (1/2n) \times V_1$$

"n" representing the number of rollers in each disk block.

The time available to take a sample out of the stopped web portion A between the rollers 19 and 29 is determined by the length D of the path between the upper position B and lower position C of the coupled disk blocks 25 and 26 and is equal to $D/V_3$. The actual sample taking then preceeds as follows.

After activation of the brake device 33, which stops web portion A, web portion 6' is drawn by suction against the upper suction bar 15 (see FIG. 4). Thereupon, cutting member 17 is actuated and web 6 is cut through in the area confined between the suction bars 13 and 14. Subsequently, lower portion bar 13 is then deactivated and the drum 11 is rotated over an angle such that, a useful length, e.g., one or several printed repeats of the web 6, is wound on the drum (see FIG. 5), the length of the web being supplied by the downward movement of roller 20 of the second accumulator device 18. The speed of displacement $V_4$ of the roller 20 then amounts to half the circumferential speed of the drum 11.

After this first angular rotation of drum 11, the drum is stopped and the web portion 6'', the front part of which is positioned along the periphery of drum 11 (see FIG. 5), is drawn by suction against the reactivated bar 13. Thereupon, cutting member 17 is actuated for the second time and web 6 is cut again. Subsequently, drum 11 is further rotated (FIG. 6), the glueing bar 16 then being located directly opposite the center of the cutting member 17. The bar 16 with the adhesive strip 34 provided thereon, then moves radially outwardly and the adhesive strip is subsequently pressed against the free end of the web portion 6' retained by bar 14, and upon the end of web portion 6'' retained by bar 13, thus joining together web portions 6' and 6'', however, without the cut-off portion position upon drum 11.

After termination of the vacuum in suction bars 13 and 14 and release of the brake device 33, the temporary stoppage of the web portion A is terminated, thereby permitting the first and second accumulator devices 8 and 18 to travel back to their original position.

Figure 7:
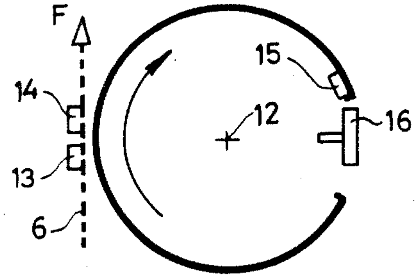

After removing the sample from the drum 11 by terminating the vacuum of suction bar 15, the drum is rotated to the position depicted in FIG. 7 and the suction bar 16 is provided with a new glueing strip in preparation for the next sampling operation.

As is apparent from the above, the device according to the invention enables continuous operation of a rotary printing installation while still allowing a sample to be taken and inspected without the conventional cutting and folding apparatus being required which, due to its complexity, frequently gives rise to disturbances and, in addition, greatly limits the maximum printing speed and thus also the operational capacity of the installation.

What is claimed is:

1. A device for taking a sample from a continuously advancing web which is subsequently continuously discharged, the device comprising means for bringing about a temporary stop zone for the web, said stop zone means comprising a combination of a first accumulator and a second accumulator for storing the supplied web, and a web supporting surface movably disposed at one side near the stop zone and positioned between said first and second accumulators, said stop zone means cooperating with sample taking means, and sample taking means comprising means for temporarily retaining the web; means for cutting the temporarily retained web twice thereby dividing said web into a first portion having a cut end, a second portion having a cut end, and a relatively small sample portion; and means for rejoining the first and second portions, the means for temporarily retaining the web comprising two fixed suction bars provided on the side of the web opposite the side adjacent to the web supporting surface, and a third suction bar provided on said web supporting surface, said cutting means being movable between the two fixed suction bars.

2. The device of claim 1, wherein the movable supporting surface comprises a drum provided near the web, the center line of said drum being transverse to the direction of travel of the web and a drive for rotating the drum.

3. The device of claim 2, wherein the drum is internally provided with a radially movable gluing bar capable of temporarily retaining one sided adhesive tape by means of a vacuum.

4. The device of claim 1, wherein the sample taking means comprise a loop system which, during the stoppage of the web, enables a web portion to be brought upon the movable supporting surface between the first and second cutting operations of the web.

5. The device of claim 4, wherein the loop system comprises a linearly displaceable turning roller rotatably attached to a piston rod of a cylinder which affords controlling an adjustable constant web tension, the system providing sufficient length of web for a portion to be taken from the web.

6. The device of claim 5, wherein the means for temporarily retaining the web retains the web at a point before the linearly displaceable turning roller and at a point past the drum when viewed in the direction of travel of the web.

7. The device of claim 1, wherein the first accumulator is coupled to the second accumulator.

8. A device for taking a sample from a continuously advancing web which is subsequently continuously discharged, the device comprising means for bringing about a temporary stop zone for the web, said means comprising a combination of a first accumulator and a second accumulator for storing the supplied web, and a web supporting surface movably disposed at one side near the stop zone and positioned between said first and second accumulators, said web supporting surface comprising a drum near the web, the center line of said drum being transverse to the direction of travel of the web, the drum being internally provided with a radially movable glueing bar capable of temporarily retaining adhesive tape by means of a vacuum, and a drive for rotating the drum, said stop zone means cooperating with sample taking means, said sample taking means comprising means for temporarily retaining the web; means for cutting the temporarily retained web twice thereby dividing said web into a first portion having a cut end, a second portion having a cut end, and a relatively small sample portion; and means for rejoining the first and second portions.

* * * * *